Figure 6:
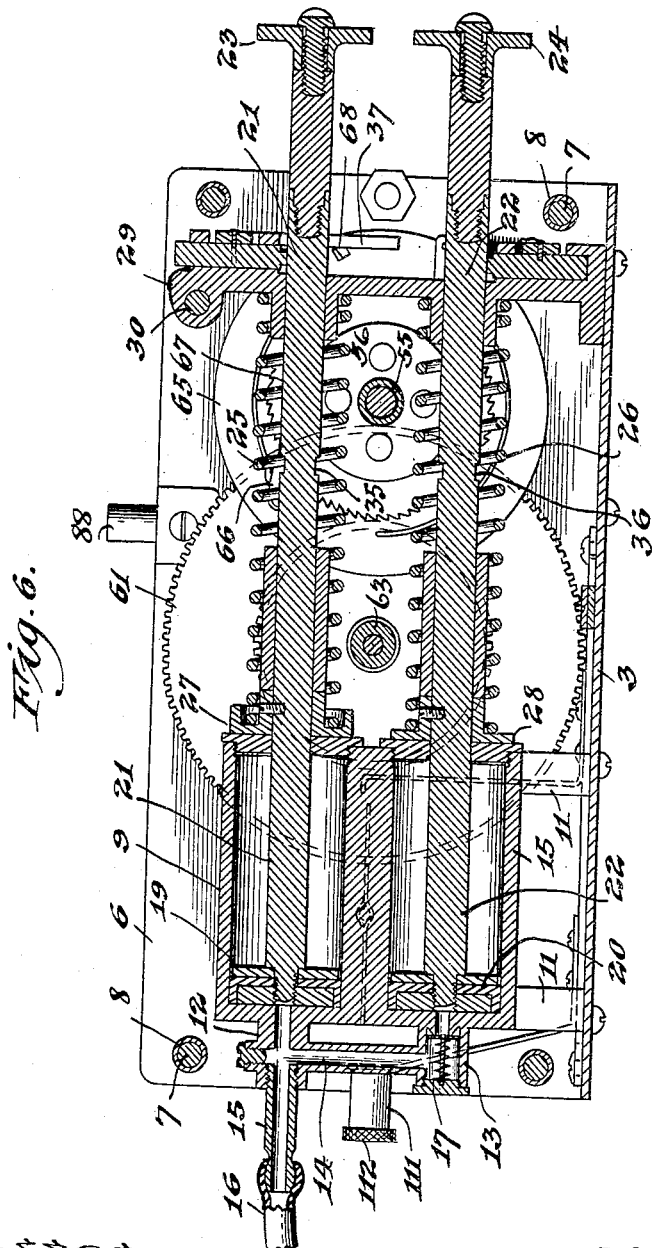

S. ROESNER.
AUTOMATIC SHUTTER CONTROLLING MECHANISM FOR CAMERAS.
APPLICATION FILED MAR. 8, 1909.
964,318.
Patented July 12, 1910.
7 SHEETS—SHEET 1.
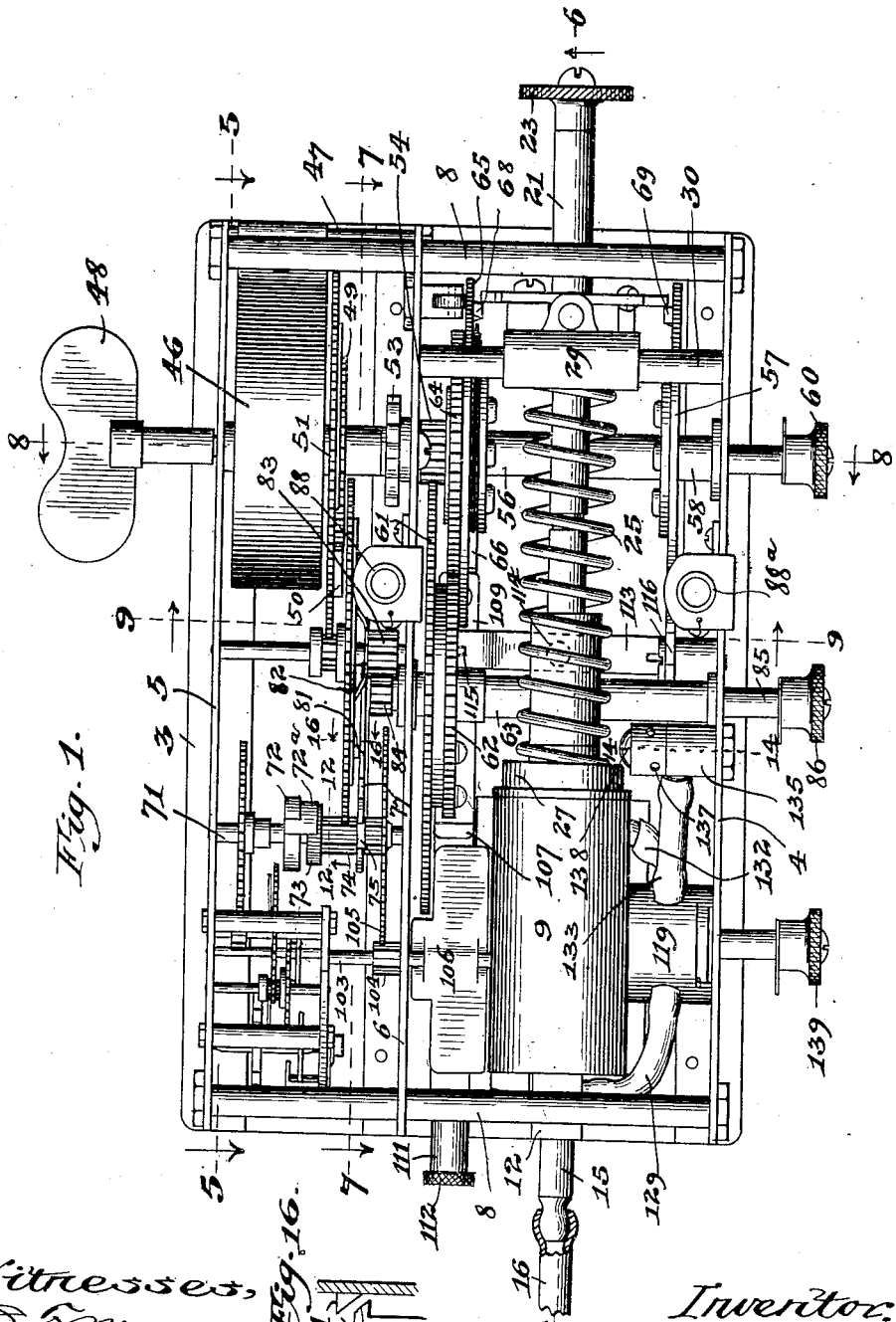

S. ROESNER.
AUTOMATIC SHUTTER CONTROLLING MECHANISM FOR CAMERAS.
APPLICATION FILED MAR. 8, 1909.
964,318.
Patented July 12, 1910.
7 SHEETS—SHEET 2.
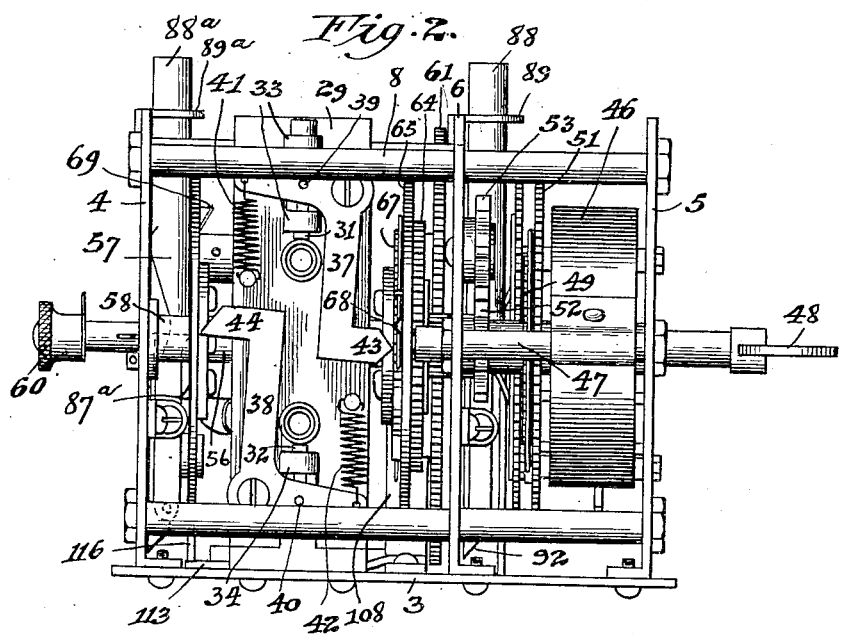
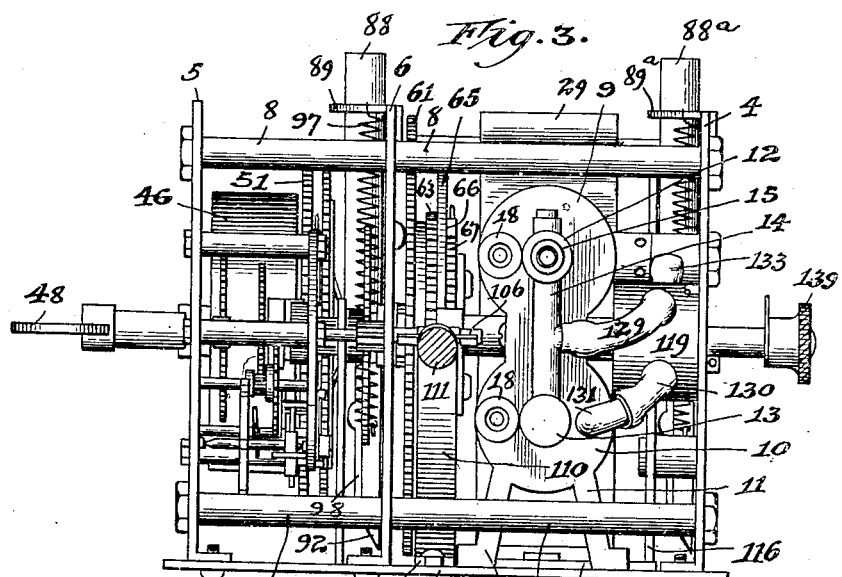

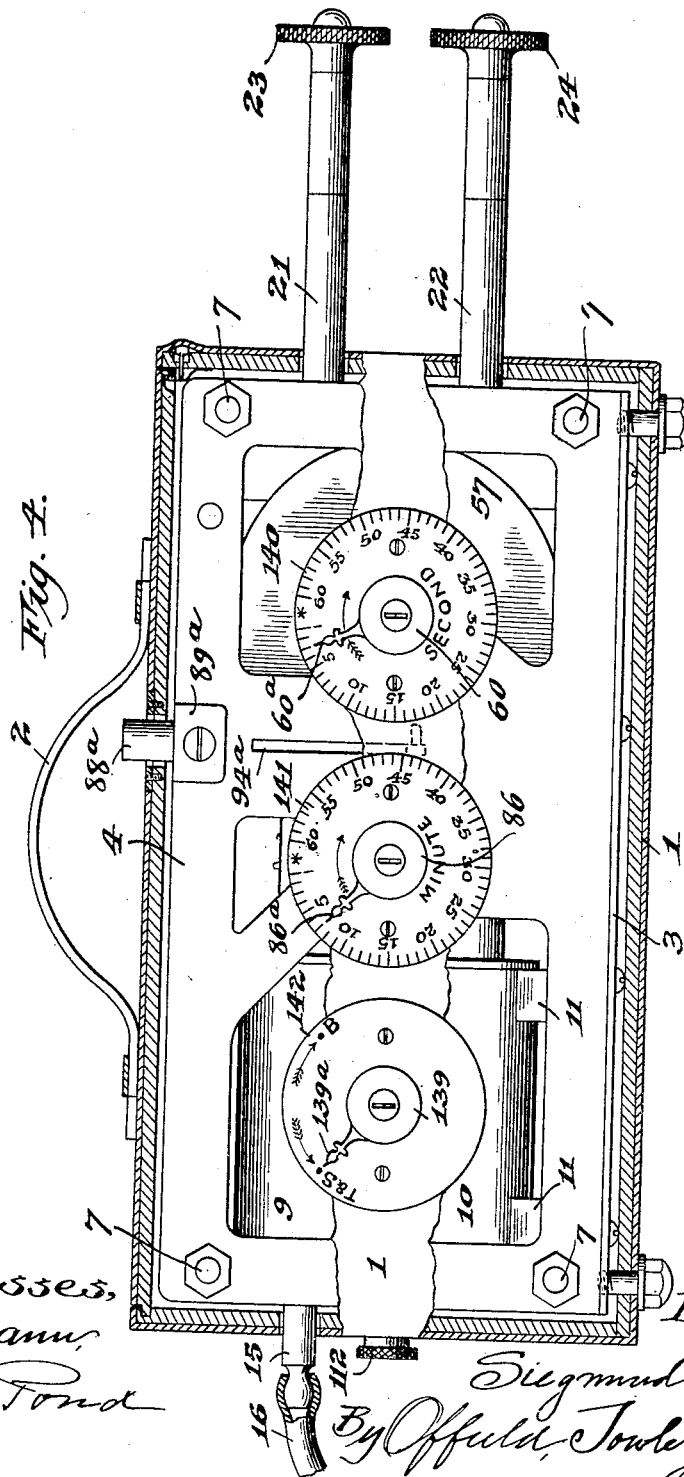

S. ROESNER.
AUTOMATIC SHUTTER CONTROLLING MECHANISM FOR CAMERAS.
APPLICATION FILED MAR. 8, 1909.
964,318.
Patented July 12, 1910.
7 SHEETS—SHEET 4.
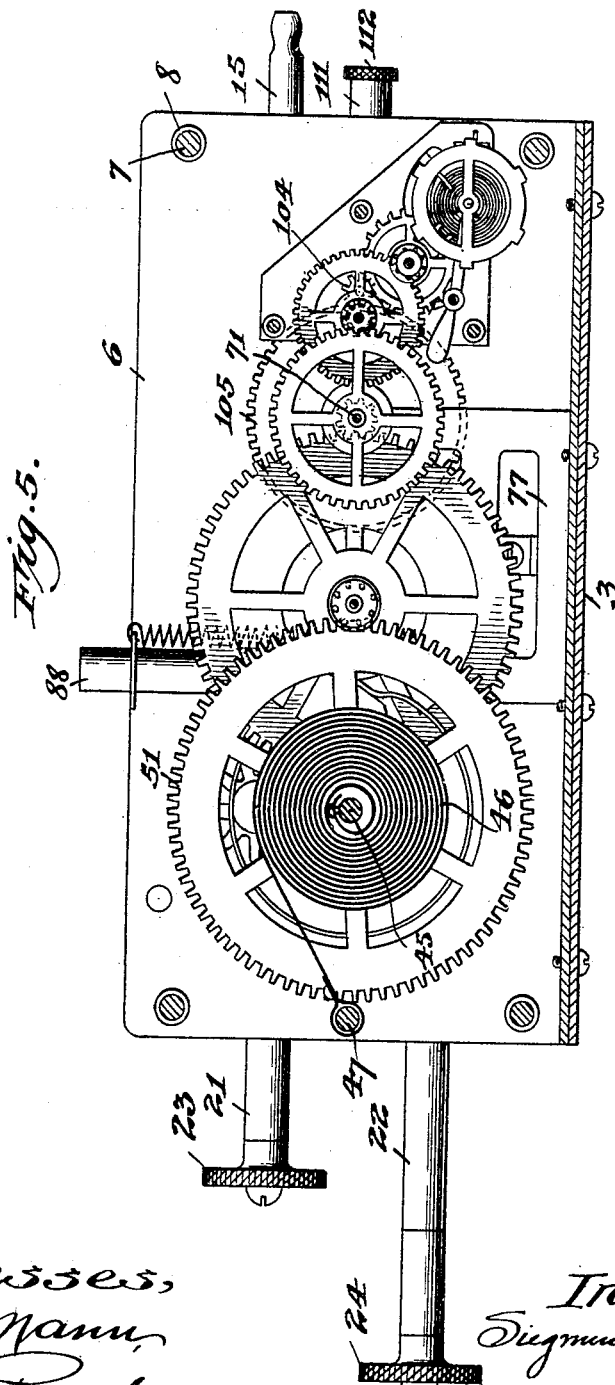

S. ROESNER.
AUTOMATIC SHUTTER CONTROLLING MECHANISM FOR CAMERAS.
APPLICATION FILED MAR. 8, 1909.

964,318.

Patented July 12, 1910.
7 SHEETS—SHEET 5.

Witnesses,
S. S. Mann
S. N. Pond

Inventor,
Siegmund Roesner,
By Offield, Towle & Linthicum
Attys.

S. ROESNER.
AUTOMATIC SHUTTER CONTROLLING MECHANISM FOR CAMERAS.
APPLICATION FILED MAR. 8, 1909.
964,318.
Patented July 12, 1910.
7 SHEETS—SHEET 6.
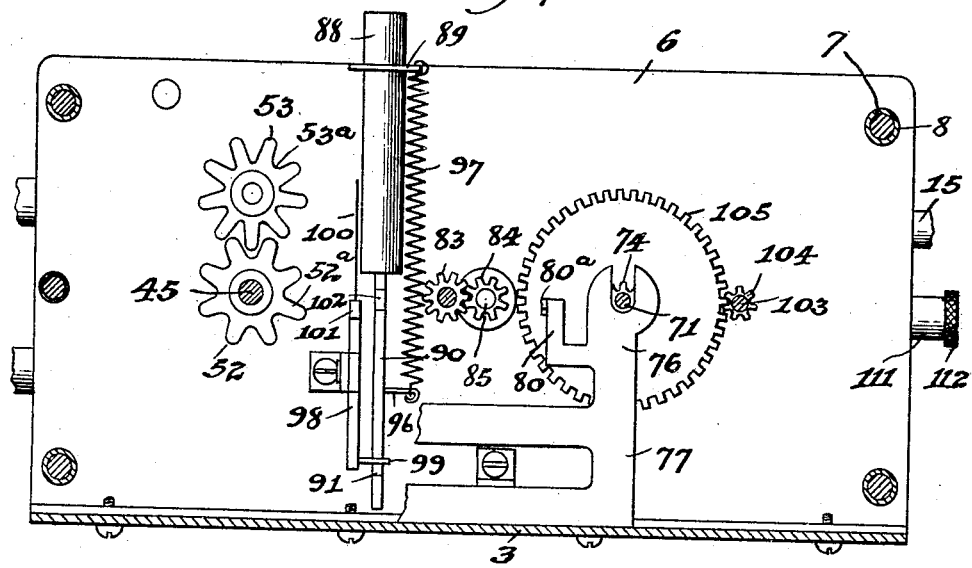
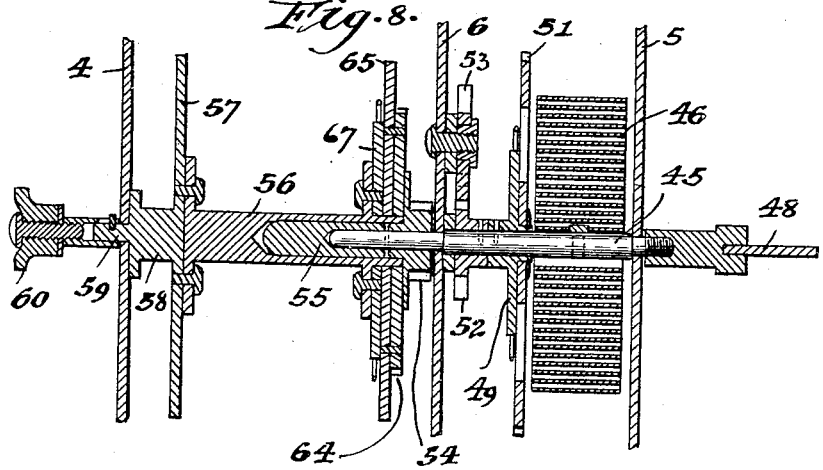

S. ROESNER.
AUTOMATIC SHUTTER CONTROLLING MECHANISM FOR CAMERAS.
APPLICATION FILED MAR. 8, 1909.
964,318.
Patented July 12, 1910.
7 SHEETS—SHEET 7.
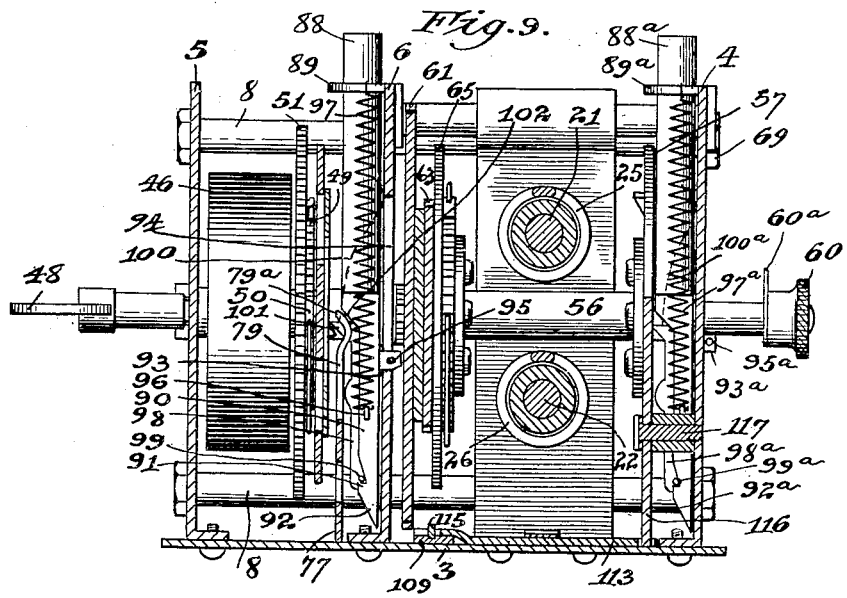
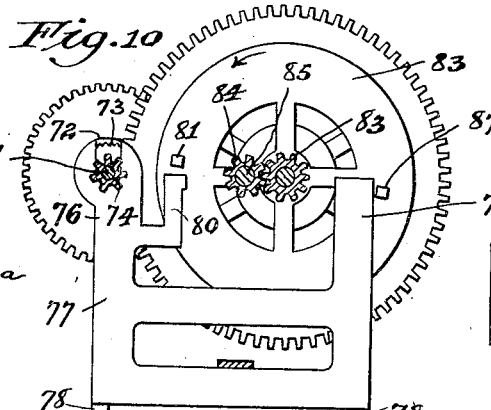
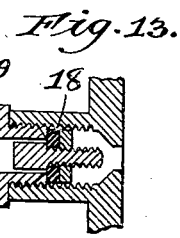
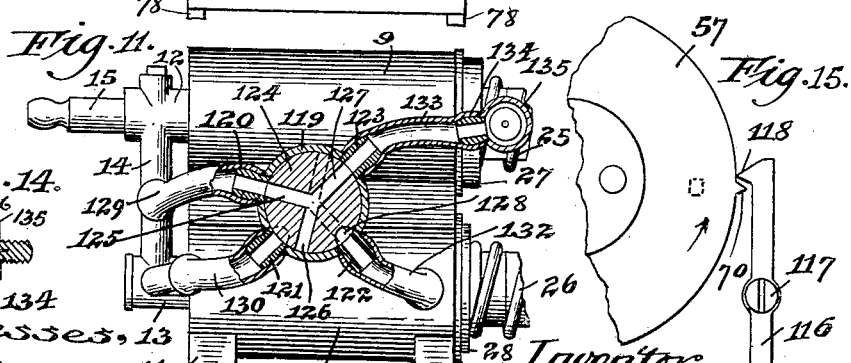
Witnesses,
S. S. Mann,
S. N. Pond
Inventor,
Sigmund Roesner,
By Offield, Towle & Linthicum
Attys.

UNITED STATES PATENT OFFICE.

SIEGMUND ROESNER, OF CHICAGO, ILLINOIS.

AUTOMATIC SHUTTER-CONTROLLING MECHANISM FOR CAMERAS.

964,318.   Specification of Letters Patent.   Patented July 12, 1910.

Application filed March 8, 1909. Serial No. 482,046.

*To all whom it may concern:*

Be it known that I, SIEGMUND ROESNER, a subject of the Emperor of Russia, who have announced my intention of becoming a citizen of the United States, residing at Chicago, in the county of Cook and State of Illinois, have invented certain new and useful Improvements in Automatic Shutter-Controlling Mechanisms for Cameras, of which the following is a specification.

This invention relates to the art of photography, and has reference more especially to a device for effecting the automatic control of camera shutters of the pneumatically operated type.

The main object of the invention is to provide an efficient and reliable mechanism which may replace the usual hand-operated bulb, which shall have the capacity of operating the shutter in any and all of the various ways now known, so as to produce the several kinds of exposure at present employed, such as " time ", " snapshot ", and " bulb ", and which, further, may be set to operate at any desired interval of time after the camera has been positioned for the picture, so as to enable the operator to be included in the picture, or to give the persons or objects to be photographed sufficient time to acquire the desired position or pose for the picture.

To this end, the invention comprises substantially a spring-actuated air-forcing device having a hose connection with the shutter-operating mechanism, a detent for maintaining it in a primed condition (that is, with the spring tensioned and ready to exert a working stroke), a motor, preferably a spring, for releasing said detent, and what I term a timing mechanism for controlling the operation of the motor to the extent of causing the latter to release the detent and thus permit the operation of the air-forcing device at the conclusion of any predetermined time period following the starting of the motor in operation. In the preferred form illustrated and described herein, this timing mechanism consists of an ordinary clock-train having a clutch connection with the motor and a clutch-uncoupling mechanism also actuated by said motor, with a manually operable device whereby said clutch-uncoupling mechanism may be set to operate at any predetermined time interval after the starting up of the motor, this last-named device thus determining the time at which the motor shall be freed from its controlling mechanism and permitted, through an accelerated movement, to effect the retraction of the detent of the air-forcing device and the release of the latter.

In its preferred and most complete form, wherein the invention is adapted to effect " time " and " bulb " exposures of the shutter, as well as " snapshot " exposures, the invention employs a pair of such spring-actuated air-forcing devices and detents therefor adapted to be successively retracted by the motor, with a manually operable device whereby the time interval between the retraction of said detents and the consequent operation of said air-forcing devices may be established according to the length of exposure desired, and a valve mechanism interposed between said air-forcing devices and the hose connection to the shutter for controlling the pneumatic impulses imparted by said air-forcing devices, according to the character of the exposure desired.

Other and minor features of the invention reside in a starting and stopping device governing the operation of the motor, with a mechanism for automatically throwing the latter into stopping relation to the motor at the conclusion of the working stroke of the air-forcing device so as to prevent the running down of the motor-spring; automatically operated targets adapted to be displayed just prior to and after the actuation of the camera shutter; indicators for showing the position of the valve which determines the character of the exposure and for showing the correct positions of the manually operable devices which establish the time period between the starting of the motor and the operative stroke of the air-forcing device, and the time period of the exposure; and other various novel detail features and combinations of mechanism entering into the complete apparatus.

In the accompanying drawings I have illustrated one practical mechanical form in which the principle of the invention may find expression, and referring thereto,—

Figure 1 is a top plan view of the complete apparatus removed from its containing box or case. Figs. 2 and 3 are end views as seen from the right and left of Fig. 1, respectively. Fig. 4 is a side elevation with the containing box or case in partial longitudinal vertical section and partially broken out on the side nearest the observer. Fig. 5 is a longitudinal vertical section on the line 5—5 of Fig. 1, viewed in the direction indicated by the arrows, and showing the spring motor and clock-train in side elevation. Fig. 6 is a vertical longitudinal section in central vertical plan of the air-forcing devices, as seen on the line 6—6 of Fig. 1. Fig. 7 is a vertical longitudinal section substantially on the line 7—7 of Fig. 1, more particularly showing the clutch-shifting and target-controlling devices. Fig. 8 is a vertical transverse section on the line 8—8 of Fig. 1, more particularly illustrating the motor spring and the driving connections therefrom to the detent-retracting devices of the air pumps. Fig. 9 is a vertical transverse section substantially on the line 9—9 of Fig. 1. Fig. 10 is a detail in side elevation of a portion of the timing mechanism, more particularly showing the means for setting the clutch-uncoupling and target-releasing mechanism to operate at any desired predetermined time. Fig. 11 is a detail in side elevation of the two air-forcing cylinders, showing in vertical section the valve mechanism through which the pneumatic impulses are controlled according to the character of the exposure desired. Fig. 12 is a cross-sectional detail through the clutch of the clock-train on the line 12—12 of Fig. 1. Fig. 13 is an enlarged detail in central longitudinal section of the air inlet valve of the air pump cylinders. Fig. 14 is a detail central longitudinal section on the line 14—14 of Fig. 1 through another member of the valve mechanism which controls the pneumatic impulses imparted by the air-pumps. Fig. 15 is a broken detail elevation of a portion of the mechanism which automatically stops the motor at the conclusion of the operative movement of the mechanism. Fig. 16 is an enlarged sectional detail on the line 16—16 of Fig. 1.

Referring to the drawings, 1 designates as an entirety a containing box or case within which the apparatus may conveniently be housed, the top of which is provided with a handle 2 to render the apparatus conveniently portable. The working mechanism of the apparatus itself is mounted in a skeleton framework which comprises essentially a horizontal base-plate 3 and parallel vertical side and intermediate walls 4, 5 and 6, respectively; said walls being connected and tied together at or near their corners by suitable tie-rods 7 and spacing sleeves 8.

On the base-plate 3 and in the compartment between the vertical walls 4 and 6 is mounted a casting comprising a pair of parallel upper and lower air pump cylinders 9 and 10, the latter having legs 11 by which the cylinders are rigidly secured to the base-plate 3 of the frame. Said cylinders 9 and 10 have on their outer ends central ported bosses 12 and 13, respectively, connected by a duct 14, thereby placing both cylinders in communication with a common or delivery nozzle 15 tapped into the end of the boss 12, on which is adapted to be coupled a hose 16 leading to the ordinary shutter-operating mechanism of a camera. The air port of the boss 13 is equipped with a self-closing valve 17, which permits outflow of the air from the cylinder 10, but prevents entrance thereto of air forced out of the cylinder 9. Each of the cylinders 9 and 10 is also provided with an ordinary air-intake valve, shown in detail at 18 in Fig. 13. Referring to Fig. 6, the cylinders 9 and 10 are equipped with pistons 19 and 20, respectively, the piston-rods 21 and 22 of which extend somewhat beyond the opposite end of the frame, and are provided at their ends with knobs 23 and 24 by which the pistons are manually retracted.

Surrounding the piston rods outside of the respective cylinders are strong coil springs 25 and 26 which at their inner ends abut against collars 27 and 28, suitably keyed to the piston-rods, and at their outer ends abut against a rigid upright post 29 that is secured at its lower end to the base-plate 3 and at its upper end is held by a transverse rod 30 between the vertical walls 4 and 6; the piston-rods slidingly engaging apertures formed in said post. It will thus be seen that the manual retraction of the pistons compresses or tensions the springs 25 and 26; and the latter are maintained in such condition until subsequently released to effect the working strokes of the piston through detent devices consisting, as best shown in the end view Fig. 2, of vertically slidable pins 31 and 32 mounted in lugs 33 and 34 on the outer face of the post 29, the inner ends of which pins are adapted to engage annular grooves 35 and 36 (Fig. 6) in the piston-rods 21 and 22, respectively, and are actuated by angle-levers 37 and 38 that are pivoted at their elbows to the outer face of the post 29; the horizontal arms of said angle-levers being loosely pinned to the detent pins 31 and 32, as shown at 39 and 40, and at their ends being connected to tension springs 41 and 42 which tend to draw the detent pins 31 and 32 into locking engagement with the annular grooves of the piston-rods. The vertical arms of the angle-levers are provided at their ends with lateral projections 43 and 44, the ends of which are beveled for purposes hereinafter described.

Referring to Figs. 5 and 8, 45 designates a driving shaft rotatably mounted in and between the walls 5 and 6 of the frame, to which shaft is secured the inner end of a strong helical spring 46 constituting the motive agent for effecting the release of the detent devices above described, the outer end of said spring being anchored to a short tie-rod 47 between the plates 5 and 6. The outer end of the shaft 45 is threaded or otherwise formed for the reception of a winding key 48. Keyed to the shaft 45 by its hub is a ratchet disk 49 which latter is engaged by one or more spring-pressed pawls 50 (Fig. 1) pivoted to a spur gear 51 that constitutes an element of a clock-train hereinafter described for controlling the movement of the motor spring. Also keyed to the shaft 45 by its hub is the lowermost of a pair of coöperating star wheels 52 and 53 (Fig. 7), the latter journaled on the wall 6, said star wheels having an unequal number of teeth and also provided, the one with an extra long tooth 52$^a$ which, after a predetermined number of revolutions, interlocks with an abnormally short notch 53$^a$ in the other wheel to prevent further winding up of the spring when the latter has been wound to a sufficient extent to properly position the immediate detent-retracting device of the upper air pump. On the reduced end of the shaft 45 which projects beyond the wall 6 is a pinion 54, the same having an elongated hub 55 axially chambered to receive said reduced end of the shaft 45. The hub 55 is itself journaled in an axially chambered shaft 56, the opposite end of shaft 56 being secured to the inner face of a cam-carrying disk 57, this latter having an integral hub 58 in longitudinal alinement with the shaft 56 and journaled at its reduced end 59 in the side wall 4. On said reduced end 59 is mounted a thumb-nut 60 by which the disk 57 can be turned manually to the proper position to effect the retraction of the detent of the lower air pump so as to effect or permit the closing of the camera shutter after a predetermined interval of exposure. The pinion 54, directly driven by the shaft 45 as above explained, through a pair of speed-reducing gears 61 and 62 (Fig. 1) journaled on a hollow shaft or sleeve 63 between the walls 4 and 6, drives a spur gear 64 pinned to a cam-carrying disk 65, which latter also has pivotally mounted thereon one or more spring-pressed pawls 66 (Fig. 1) that drivingly engage a ratchet disk 67 rigid with the shaft 56. By this construction the unwinding movement of the motor spring drives the disk 65 positively through the pinion 54, counter gears 61 and 62, and gear 64, and likewise drives the disk 57 in the same direction and at the same speed through the pawl and ratchet connection 66, 67, to the shaft 56; while permitting the winding up of the motor spring without affecting the disk 57, as likewise the back turning and setting of the disk 57 without affecting the motor spring.

The disk 65 carries on its inner face a V-shaped projection or tooth 68 (Fig. 6) that, in the primed condition of the apparatus, in which it is ready to operate upon the starting of the motor, lies slightly above the lateral projection or toe of the detent-tripping lever 37, as shown in Fig. 2, the latter being pressed toward the disk by its spring 41 and lying across the path of travel of the tooth 68. The disk 57 is also provided on its inner face with a similar cam-shaped projection or tooth 69 so located that the beveled end or toe 44 of the angle-lever 38 normally lies across its path of travel, being projected into such position by its spring 42. The disk 57 also has formed on its periphery a radially projecting cam tooth 70, best shown in the detail view Fig. 15, which latter tooth constitutes the active agent of an automatic stop mechanism for arresting the further unwinding movement of the motor spring, as hereinafter more fully explained.

Having thus far described the mechanism through which the motor spring 46 effects the tripping or retraction of the detent devices and thus permits the spring-actuated air-forcing devices to operate on their working strokes, I will next describe what I term a timing mechanism, through the agency of which the motor spring is prevented from thus actuating the detent devices until after the expiration of a predetermined time interval following the starting of the motor in operation. This timing mechanism comprises, as an entirety, an ordinary clock-train with a clutch interposed therein for releasing the motor from the drag of the clock-train, a clutch-uncoupling device that is also actuated through the agency of the motor spring, and a manually operable device for setting the clutch-uncoupling mechanism to operate at the expiration of any predetermined interval after the starting of the mechanism in operation. The clock-train referred to is best shown in Figs. 1 and 5 as housed between the side and intermediate walls 5 and 6 of the frame and comprising an ordinary train of speed-multiplying and power-reducing spur gears and pinions with their counter-shafts, of which the spur gear 51 constitutes the initial or driving element. As the parts of such a clock-train are old and well understood, it is deemed unnecessary to specifically set forth the individual elements thereof, except to the extent that the mechanism is modified for the purposes of the present invention.

Fast on one of the counter-shafts 71 of the train is the fixed member 72 of a clutch, coöperating with which is a slidable clutch-member 73 which, as shown in the detail view Fig. 12, is essentially a milled nut adapted by a sliding movement to engage and disengage a spring tongue 72$^a$ carried by the fixed clutch-member 72. The clutch-member 73 has an extended toothed hub 74 constituting in effect an elongated pinion and provided between its ends with an annular groove 75 that is engaged by the forked arm 76 (Fig. 10) of an upright clutch-shifting frame 77, this latter at its lower edge being loosely pivoted by toes 78 in apertures or sockets in the base-plate 3. The frame 77 at its opposite end has an upstanding arm 79 with an angularly bent or beveled upper end 79ª (Fig. 9); while integral with the arm 76 is an edgewise offset upstanding finger 80, the upper end of which is formed, as shown in the detail view Fig. 16, with a beveled lateral projection 80ª adapted for engagement with a cam-lug 81 formed on the face of a friction disk 82 (Fig. 10) that engages one of the intermediate spur gears of the clock-train. The hub of the friction disk 82 is formed as a pinion 83, with which meshes a pinion 84 on the end of a shaft 85 that is rotatably mounted in the hollow shaft or sleeve 63 previously mentioned, and extends outside the side wall 4 and is provided with a coupling for a thumb-nut 86 for manually setting the same. The friction disk 82 is also provided at a point substantially diametrically opposite the cam-lug 81 with another cam-lug 87 (Fig. 10) set closer to the axis of rotation of said disk so as to have a different circular path of travel from that of the cam-lug 81. The cam-lug 87 is designed to effect the release of a spring-actuated target or signal designed to be displayed a few seconds before the release of the motor spring and the operation of the apparatus, as a notice or warning that the exposure is about to be made. This target device is best illustrated in Figs. 7 and 9, and comprises an upright rod or tube 88 that is slidably mounted in an apertured bracket-guide 89 secured to the upper edge of the intermediate wall 6, and has secured to its lower end a flat strip or blade 90, the lower end of which is formed with a hook 91 having a tapered or beveled point 92. On the back of the strip 90 is an apertured guide-lug 93 playing in a vertical slot 94 in the wall 6 and confined by a pin 95.

To a lateral lug 96 on the strip 90 is anchored the lower end of a tensile spring 97, the upper end of which is anchored to the bracket 89, whereby said spring normally tends to raise the target. The target is detained in lowered position by a pivoted detent lever 98 provided at its lower end with a pin 99 adapted to engage the hook 91 and normally pressed into such engagement by a light bow spring 100 secured to the upper end of said detent lever and abutting against the wall 6. The upper end of the detent lever 98 has a laterally projecting nose 101 beveled on its under side for coöperation with the cam-lug 87 on the rising movement of the latter. The lugs 81 and 87 are so positioned that the latter engages the lever 98 and releases the target just before the former uncouples the clutch. On the edge of the blade or strip 90 adjacent to the clutch-shifting frame 77 is formed an inclined or cam surface 102 adapted to coöperate with the bent end 79ª of the arm 79 of said clutch-shifting frame 77 when the target is depressed. When the target is depressed, it is automatically engaged by the detent, the beveled lower edge 92 forcing the pin 99 to one side until the hook has passed below said pin, whereupon the latter at once engages the hook under the action of the controlling spring 100. Located adjacent to the inner side of the side wall 4 is another target device which is a duplicate of that already described, and the several parts of which are identified by corresponding reference numerals with an alphabetical exponent. The detent lever 98ª of this device is retracted by a cam-lug 87ª having the same function and operation as the cam-lug 87 and located on the outer face of the disk 57 (Fig. 2). The purpose of the target 88ª is to signal the closing of the camera shutter and the completion of the exposure as soon as the latter has taken place.

A stop mechanism for arresting and releasing the clock-train, as well as for arresting the further unwinding movement of the motor spring when the mechanism has completed its work, comprises the following parts. Referring to Figs. 1, 2, 3, 9 and 15, 103 designates one of the counter-shafts of the clock-train carrying a pinion 104 meshing with and driven by a spur gear 105 rigid with the clutch pinion 74. Fast on the shaft 103 is a fly 106. The wings or vanes of the fly are adapted to be engaged and disengaged by the laterally bent end or hook 107 of a post 108 (Fig. 2), the base of which is secured to a slide-bar 109 mounted on the base-plate 3. A manually operable device for actuating the slide 109 so as to move the hook 107 into and out of engagement with the fly comprises an arm 110 (Fig. 3) secured to the outer end of the slide 109 and provided on its upper end with a short horizontal stem 111 adapted to project through an aperture in the outer case or housing and provided with a push-button 112. A device for automatically moving the detent 107 into engagement with the fly comprises a lever 113 pivoted centrally at 114 (Fig. 1) to the base-plate 3, one forked end of said lever engaging a pin 115 in the slide 109 and the other forked end engaging the lower end of an upright lever 116 (Figs. 3 and 9) pivotally mounted on a stub-shaft 117 secured in the side wall 4. The upper end of lever 116 has a V-shaped nose 118 (Fig. 15) adapted for coöperation with the cam-tooth 70 on the periphery of the disk 57. The cam-tooth 70 is so placed relatively to the cam-lug 69 which retracts the detent lever 38 of the lower air-forcing device that immediately following the actuation of said detent lever by the cam-lug 69, the cam-tooth 70 engages the lever 116 in a manner to shift the detent 107 into engagement with the fly and thus arrest further running down of the motor spring.

Referring now to the valve mechanism whereby the pneumatic impulses imparted by the air-forcing devices are controlled as to their effect upon the operating mechanisms of the shutter so as to produce a "time" or "bulb" exposure of any desired length within the usual limits of such exposures, or a "snapshot" exposure, and referring principally to Figs. 1, 3, 4, 6 and 11, 119 designates a circular valve-casing equipped with four radially projecting nipples 120, 121, 122 and 123; and within said valve-casing is a circular valve-body 124 provided with three radial ways 125, 126 and 127. Said valve-body is also provided in its periphery with a longitudinally extending duct 128 leading to the atmosphere through one of the outer faces of the valve-body and constituting a vent or escape duct. The nipple 120 communicates freely with the duct 14 which connects the delivery nozzles of the two cylinders by a hose 129. The nipple 121 communicates freely through a hose 130 with an angularly bent vent nozzle 131 (Fig. 3) in the end of the lower cylinder 10. The nipple 122 communicates freely through a hose 132 with a lateral aperture in the cylinder wall 10 near the inner end of the latter, which aperture is covered by the piston when the latter is fully retracted, as in the primed condition of the apparatus for effecting the "time" or "bulb" exposure. The nipple 123 communicates freely through a hose 133 with a nipple 134 of an auxiliary valve-casing 135 (Figs. 11 and 14), in which is a spring-pressed valve 136 controlling a port leading to the atmosphere through one or more lateral ports 137 (Fig. 1) in the walls of the valve-casing. The valve 136 is connected through its stem to a ball 138 that slidably fills the open end of the valve-casing 135; and by reference to Fig. 1 it will be seen that the outer face of the ball 138 is normally projected by the valve-closing spring across the path of travel of the edge of the spring abutment collar 27; so that said collar trips the ball 138 and instantly opens the valve 136 just before the piston 19 reaches the limit of its forcing stroke. On the valve-body 124 is an axial stem projecting through the frame wall 4, as likewise through the outer case 1 and provided with a thumb-nut 139 for setting the valve. By reference to Figs. 1 and 4 it will be seen that the several thumb-nuts 66, 86 and 139 are equipped with radial pointers 60ª, 86ª and 139ª, respectively, which coöperate with dial-plates 140, 141 and 142, respectively, secured externally to the side wall of the containing box 1. The dial 140 is graduated in seconds, and in connection with its pointer indicates the length of a "time" or a "bulb" exposure. The dial 141 is graduated in minutes, and indicates, in connection with its pointer, the interval of time elapsing between the starting of the clock-train in operation and the actuation of the camera shutter by the device. The dial 142 has two positions marked thereon, one representing the position to which the pointer should be brought to set the valve for "time" and "snap-shot" exposures, and the other representing the position to which the pointer should be brought to set the valve for a "bulb" exposure. The normal directions in which the pointers are to be turned in setting the apparatus are indicated by the arrows on the faces of the dials in Fig. 4.

The operation of the apparatus has been to a considerable extent indicated in connection with the detail description of its several parts and mechanisms; but the correct mode of manipulating to secure its operation in connection with the several kinds of exposure referred to may be briefly described as follows. Assuming that the main or delivery nozzle 15 of the device is connected with the shutter-operating cylinder of the camera, as by the hose 16, in all cases the motor spring is first wound up to the limit determined by the stop gears 52, 53, which operation carries the detent-actuating tooth 68 slightly above the beveled toe 43 of the detent lever 37, as shown in Fig. 2; and in this connection it is noted that the parts last named are beveled both on their upper and under sides, so that the tooth 68 may pass the toe of the lever in either direction. Assuming that a time exposure of say, three seconds' duration is to be made, and that the shutter is to be operated seven minutes after the clock-train is started in operation, the several pointers are set to the indicating positions on the dials shown in Fig. 4, which places the valve in the full-line position shown in Fig. 11, places the cam-lug 81 seven minutes' travel from the beveled nose 80ª of the clutch-operating device, and places the cam-lug 69 three seconds' travel from the beveled arm 44 of the detent-retracting lever 38. The targets are then depressed, the cam 102 of the target 88 actuating the clutch-shifting frame so as to couple the clutch of the clock-train. The two pistons are then retracted and automatically locked in retracted position with their actuating springs tensioned by the detent pins 31 and 32. By then pushing the button 112 inwardly, the fly is released and the clock-train begins to run. A few seconds before the expiration of the seven minutes, the cam-lug 87 strikes the cam projection 101 of the detent lever 98, which releases the target 88, allowing the latter to rise and signal the near approach of the exposure; and at the expiration of the seven minutes, the cam-lug 81 trips the clutch-shifter 77, uncoupling the clutch, which thereupon permits the spring to unwind at a greatly accelerated speed, instantly causing the cam-tooth 68 to trip the detent lever 37 and retract the detent 31, whereupon the spring 25 instantly expands, forcing the upper piston on its air-compressing stroke and opening the camera shutter by the pneumatic impulse thus created. The instant the collar 27 strikes the ball 138, the auxiliary valve 136 is opened, thus venting the main air-conducting hose 16 and releasing the pressure in the pneumatic cylinder of the shutter-actuating mechanism of the camera. Three seconds after this has occurred, the cam-tooth 69 trips the detent lever 38, retracting the detent pin 32, and instantly permitting the piston of the lower cylinder to make an air-compressing stroke. The pneumatic impulse thus created is delivered through the hose 16 and effects the closing of the camera shutter; the valves 124 and 136 being at this time in such positions as to cut off the vents through the hose sections 130 and 129, respectively. Immediately after the cam-tooth 69 has thus released the piston of the lower cylinder, the peripheral cam-tooth 70 trips the lever 116, as shown in Fig. 15, thereby throwing the detent hook 107 into engagement with the fly and arresting the further unwinding of the motor spring; and simultaneously the cam-lug 87$^a$ engages and retracts the detent lever 98$^a$ of the bracket 88$^a$, and the latter rises, indicating the closing of the camera shutter.

Where a "snapshot" exposure is to be made, the apparatus is set and operated in the same way, except that the lower piston is not retracted, and it is not necessary to set the mechanism determining the interval of the exposure, since the pneumatic impulse imparted by the upper piston alone effects both the opening and closing of the camera shutter through a proper setting of the shutter-actuating mechanism of the camera, as well understood.

In what is known as a "bulb" exposure, the compression of the bulb opens the shutter, and the subsequent release and expansion of the bulb effects the closing of the shutter. To produce the exposure of this character, the pointer 139$^a$ is turned to the "B" position, which rotates the valve 124 to the dotted-line position indicated in Fig. 11, in which position it will be understood that the duct 126 occupies the same position as the duct 125 is shown as occupying in said figure. This places the ducts 129 and 132 in communication with each other through the three-way valve and brings the vent port 128 into communication with the duct 130. The pointer 60$^a$ is then set according to the intended duration of the exposure (which is usually short, not exceeding two to five seconds at the most), and the device is otherwise operated as already described in connection with a time exposure. Since the duct 133 is out of communication with the valve 124, the pneumatic impulse created by the forcing stroke of the upper piston, which opens the camera shutter, is not vented by the valve 136, but the pressure is maintained through the lower piston-closed duct 132 until the lower piston has been released and starts on its forward travel, which instantly vents the hose and permits the camera shutter to close. Idle compression of the air in advance of the lower piston at this time is prevented by the communication of the peripheral duct 128 of the valve with the exhaust duct 130 leading from the forward end of the cylinder, so that the air in advance of the piston finds a free escape therethrough, and the piston movement is not retarded.

Not only is the device of my invention useful in all situations where a hose and hand bulb might be employed, but it is also useful in situations where the use of a hose and hand bulb is impractical or impossible, as in the case of cameras attached to balloons and kites.

I am aware that automatic shutter-controlling devices for cameras designed to effect a limited manipulation of the camera shutter are broadly old; but, so far as I am aware, my invention presents the first instance of an automatic mechanism capable of effecting any and all of the three kinds of exposure obtainable with bulb-operated cameras. Hence, while I have shown and described one practical mechanical form in which the invention may be embodied, yet within the scope of the claims hereunto appended, the apparatus may be considerably modified in respect to details without involving any departure from the principle of the invention or sacrificing any of the advantages thereof.

I claim:

1. In an automatic shutter-controlling mechanism for cameras, the combination of a spring-actuated air-forcing device having a hose connection with the shutter-operating mechanism, a detent for said air-forcing device, a motor for retracting said detent, a clock-train having a clutch-connection with said motor, and a clutch-uncoupling mechanism actuated by said motor, substantially as described.

2. In an automatic shutter-controlling mechanism for cameras, the combination of a spring-actuated air-forcing device having a hose connection with the shutter-operating mechanism, a detent for said air-forcing device, a motor for retracting said detent, a clock-train having a clutch connection with said motor, a clutch-uncoupling mechanism actuated by said motor, and manually operable means whereby said clutch-uncoupling mechanism may be set to operate at any predetermined time after the motor has been started, substantially as described.

3. In an automatic shutter-controlling mechanism for cameras, the combination of a spring-actuated air-forcing device having a hose connection with the shutter-operating mechanism, a detent for said air-forcing device, a spring-actuated target, a detent therefor, a motor for retracting said detents, and a timing mechanism geared to said motor and controlling the time when the latter operates to retract said detents, substantially as described.

4. In an automatic shutter-controlling mechanism for cameras, the combination of a spring-actuated air-forcing device having a hose connection with the shutter-operating mechanism, a detent for said air-forcing device, a spring-actuated target, a detent therefor, a motor for retracting said detents, a clock-train having a clutch connection with said motor, and a clutch-uncoupling and target-releasing mechanism actuated by said motor, substantially as described.

5. In an automatic shutter-controlling mechanism for cameras, the combination of a spring-actuated air-forcing device having a hose connection with the shutter-operating mechanism, a detent for said air-forcing device, a spring-actuated target, a detent therefor, a motor for retracting said detents, a clock-train having a clutch connection with said motor, a clutch-uncoupling and target-releasing mechanism actuated by said motor, and manually operable means whereby said clutch-uncoupling and target-releasing mechanism may be set to operate at any predetermined time after the motor has been started, substantially as described.

6. In an automatic shutter-controlling mechanism for cameras, the combination of a pair of spring-actuated air-forcing devices having a hose connection with the shutter-operating mechanism, detents for said air-forcing devices, a motor adapted to successively retract said detents, a timing mechanism geared to said motor and controlling the time when the latter operates to retract said detents, and a valve mechanism controlling the pneumatic impulses imparted by said air-forcing devices according to the character of the exposure desired, substantially as described.

7. In an automatic shutter-controlling mechanism for cameras, the combination of a pair of spring-actuated air-forcing devices having a hose connection with the shutter-operating mechanism, detents for said air-forcing devices, a motor adapted to successively retract said detents, a clock-train having a clutch connection with said motor, a clutch-uncoupling mechanism actuated by said motor, manually operable means whereby said clutch-uncoupling mechanism may be set to operate at any predetermined time after the motor has been started, and a valve mechanism controlling the pneumatic impulses imparted by said air-forcing devices according to the character of the exposure desired, substantially as described.

8. In an automatic shutter-controlling mechanism for cameras, the combination of a motor, a clock-train having a clutch connection with said motor, a clutch-uncoupling mechanism actuated by said motor, a pair of spring-actuated air-forcing devices having a hose connection with the shutter-operating mechanism, a pair of detents for said air-forcing devices, respectively, adapted to be successively retracted by said motor when the latter has been disconnected from said clock-train, manually operable means for establishing the time interval between the retraction of said detents, and a valve mechanism controlling the pneumatic impulses imparted by said air-forcing devices according to the character of the exposure desired, substantially as described.

9. In an automatic shutter-controlling mechanism for cameras, the combination of a motor, a clock-train having a clutch connection with said motor, a clutch-uncoupling mechanism actuated by said motor, a pair of spring-actuated air-forcing devices having a hose connection with the shutter-operating mechanism, a pair of detents for said air-forcing devices, respectively, adapted to be successively retracted by said motor when the latter has been disconnected from said clock-train, manually operable means whereby said clutch-uncoupling mechanism may be set to disconnect said motor and clock-train at any predetermined time after the motor has been started, manually operable means for establishing the time interval between the retraction of said detents, and a valve mechanism controlling the pneumatic impulses imparted by said air-forcing devices according to the character of the exposure desired, substantially as described.

10. In an automatic shutter-controlling mechanism for cameras, the combination of a pair of spring-actuated air-forcing devices having a hose connection with the shutter-operating mechanism, detents for said air-forcing devices, a motor adapted to successively retract said detents, a timing mechanism geared to said motor and controlling the time when the latter operates to retract said detents, a pair of spring-actuated targets, detents normally holding said targets in retracted position, means actuated by said motor for retracting said target detents just before and after the release of said air-forcing devices, respectively, and a valve mechanism controlling the pneumatic impulses imparted by said air-forcing devices according to the character of the exposure desired, substantially as described.

11. In an automatic shutter-controlling mechanism for cameras, the combination of a frame, a pair of air-pumps mounted therein, springs to actuate the pistons of said air-pumps on their air-forcing strokes, manually operable means for retracting said pistons and tensioning said springs, detents to hold said pistons in retracted position, a spring motor for retracting said detents to release said pistons, a motor-controlling mechanism determining the time period between the starting of said motor and the release of one of said pistons, and a manually adjustable device determining the time period elapsing between the release of said first piston and the subsequent release of said second piston, substantially as described.

12. In an automatic shutter-controlling mechanism for cameras, the combination of a spring-actuated air-forcing device having a hose connection with the shutter-operating mechanism, a detent for said air-forcing device, a motor for retracting said detent, and an automatic stop mechanism for arresting the operation of said motor upon the release of said air-forcing device, substantially as described.

13. In an automatic shutter-controlling mechanism for cameras, the combination of a spring-actuated air-forcing device having a hose connection with the shutter-operating mechanism, a detent for said air-forcing device, a motor for retracting said detent, and an automatic stop mechanism for arresting the operation of said motor upon the release of said air-forcing device, substantially as described.

14. In an automatic shutter-controlling mechanism for cameras, the combination of a spring-actuated air-forcing device having a hose connection with the shutter-operating mechanism, a detent for said air-forcing device, a motor for retracting said detent, a speed-multiplying gear-train connected to said motor, a fly mounted on a shaft of said gear-train, a detent for said fly, manually operable means for retracting said fly-detent, and automatically-actuated means for moving said fly-detent into engagement with said fly upon the retraction of the detent of said air-forcing device, whereby to arrest the operation of said motor, substantially as described.

15. In an automatic shutter-controlling mechanism for cameras, the combination of a spring-actuated air-forcing device having a hose connection with the shutter-operating mechanism, time-controlled mechanism for effecting the actuation of said air-forcing device, and a valve mechanism automatically venting said hose connection at the completion of the pressure impulse imparted by said air-forcing device, substantially as described.

16. In an automatic shutter-controlling mechanism for cameras, the combination of a pair of spring-actuated air-forcing devices having a common hose connection with the shutter-operating mechanism, time-controlled mechanism for effecting the successive actuations of said air-forcing devices, and adjustable valve mechanism for controlling the pneumatic impulses imparted by said air-forcing devices, said valve mechanism when in one position causing successive pressure effects through said hose connection synchronously with the respective actuations of said air-forcing devices, and when in the other position causing successive pressure and venting effects synchronously with the respective actuations of said air-forcing devices, substantially as described.

17. In an automatic shutter-controlling mechanism for cameras, the combination of a pair of spring-actuated air-forcing devices having a common hose connection with the shutter-operating mechanism, time-controlled mechanism for effecting the successive actuations of said air-forcing devices, and a three-way valve adapted to communicate with said air-forcing devices, said hose connection, and the atmosphere, and means for setting said valve between a position wherein it causes successive pressure effects through said hose connection synchronously with the respective actuations of said air-forcing devices, and a position wherein it causes successive pressure and venting effects synchronously with the respective actuations of said air-forcing devices, respectively, substantially as described.

18. In an automatic shutter-controlling mechanism for cameras, the combination with a containing case, of a motor, a clock-train having a clutch connection with said motor, a clutch-uncoupling mechanism actuated by said motor, a spring-actuated air-forcing device having a hose connection with the shutter-operating mechanism, a detent for said air-forcing device adapted to be retracted by said motor when the latter has been disconnected from said clock-train, manually operable means including a shaft projecting through a wall of said case for setting said clutch-uncoupling mechanism to operate at any predetermined time after the motor has been started, a pointer on the projecting portion of said shaft, and a time-indicating dial on the side of said case coöperating with said pointer, substantially as described.

19. In an automatic shutter-controlling mechanism for cameras, the combination with a containing case, of a motor, a clock-train having a clutch-connection with said motor, a clutch-uncoupling mechanism actuated by said motor, a pair of spring-actuated air-forcing devices having a hose connection with the shutter-operating mechanism, a pair of detents for said air-forcing devices, respectively, adapted to be successively retracted by said motor when the latter has been disconnected from said clock-train, manually operable means including a shaft projecting through a wall of said case, for setting said clutch-uncoupling mechanism to operate at any predetermined time after the motor has been started, other manually operable means including a shaft projecting through a wall of said case for establishing a time interval between the retraction of said detents, pointers on the projecting portions of said shafts, and time-indicating dials on the side of said case coöperating respectively with said pointers, substantially as described.

20. In an automatic shutter-controlling mechanism for cameras, the combination with a containing case, of a motor, a clock-train having a clutch-connection with said motor, a clutch-uncoupling mechanism actuated by said motor, a pair of spring-actuated air-forcing devices having a hose connection with the shutter-operating mechanism, a pair of detents for said air-forcing devices, respectively, adapted to be successively retracted by said motor when the latter has been disconnected from said clock-train, manually operable means including a shaft projecting through a wall of said case, for setting said clutch-uncoupling mechanism to operate at any predetermined time after the motor has been started, other manually operable means including a shaft projecting through a wall of said case for establishing a time interval between the retraction of said detents, pointers on the projecting portions of said shafts, and time-indicating dials on the side of said case coöperating respectively with said pointers, a movable valve controlling the pneumatic impulses imparted by said air-forcing devices according to the character of the exposure desired, a valve-actuating shaft projecting through a wall of said case, a pointer on the projecting portion of said shaft, and a position-indicating dial on the side of said case coöperating with said last-named pointer, substantially as described.

SIEGMUND ROESNER.

Witnesses:
SAMUEL N. POND,
MATTIE B. BLISS.